United States Patent
Greenblatt et al.

(10) Patent No.: US 9,592,868 B2
(45) Date of Patent: Mar. 14, 2017

(54) MODULAR BICYCLE RACK

(71) Applicant: Everlast Climbing Industries, Inc., Mendota Heights, MN (US)

(72) Inventors: Joel Cooper Greenblatt, Wauwatosa, WI (US); Andrew Patrick Kennedy Lageson, Minneapolis, MN (US)

(73) Assignee: EVERLAST CLIMBING INDUSTRIES, INC., Mendota Heights, MN (US)

(*) Notice: Subject to any disclaimer, the term of this patent is extended or adjusted under 35 U.S.C. 154(b) by 0 days.

(21) Appl. No.: 14/548,862

(22) Filed: Nov. 20, 2014

(65) Prior Publication Data

US 2016/0144912 A1    May 26, 2016

(51) Int. Cl.
| | | |
|---|---|---|
| *E05B 73/00* | (2006.01) | |
| *B62H 3/00* | (2006.01) | |
| *B62H 5/00* | (2006.01) | |
| *F16B 41/00* | (2006.01) | |
| *F16B 5/02* | (2006.01) | |
| *B62H 3/04* | (2006.01) | |
| *B62H 3/06* | (2006.01) | |

(52) U.S. Cl.
CPC ............ *B62H 3/00* (2013.01); *B62H 3/04* (2013.01); *B62H 3/06* (2013.01); *B62H 5/00* (2013.01); *F16B 5/02* (2013.01); *F16B 41/005* (2013.01)

(58) Field of Classification Search
CPC ... B62H 3/04; B62H 3/00; B62H 3/08; B62H 3/06; B60R 9/10
USPC .......................................... 211/5, 17, 20, 22
See application file for complete search history.

(56) References Cited

U.S. PATENT DOCUMENTS

| | | | | |
|---|---|---|---|---|
| 2,329,088 A | * | 9/1943 | Schram et al. | 211/17 |
| 3,599,798 A | * | 8/1971 | Osborn | 211/20 |
| 3,785,500 A | * | 1/1974 | Kennelly | 211/5 |
| 3,841,119 A | * | 10/1974 | Kaufmann | 70/58 |
| 4,022,325 A | * | 5/1977 | Barrett et al. | 211/11 |
| 4,033,459 A | * | 7/1977 | Zach | 211/20 |
| 4,371,082 A | * | 2/1983 | Hostert et al. | 211/22 |

(Continued)

FOREIGN PATENT DOCUMENTS

DE        9409746        *    8/1994    ............... B62H 3/00

OTHER PUBLICATIONS

MachineTranslation of DE 9409746, retrieved from espacenet.com, Feb. 8, 2016.*

*Primary Examiner* — Leslie A Nicholson, III
*Assistant Examiner* — Kimberley S Wright
(74) *Attorney, Agent, or Firm* — McAndrews, Held & Malloy, Ltd.

(57) ABSTRACT

The present disclosure is directed to a modular bicycle rack that includes at least a first hoop structure, a second hoop structure, a first connector plate, and a second connector plate. The first hoop structure is attached to the second hoop structure by each of the first and second connector plates. A bicycle rack that is capable of providing parking and locking surfaces for at least four bicycles may be provided using only two connected hoop structures. However, additional parking and locking surfaces may be provided simply by the further connection of additional hoop structures. Embodiments of the present disclosure are also directed to a set of components that is configured to be easily shipped, such as by a parcel carrier, and assembled to provide a bicycle rack.

15 Claims, 7 Drawing Sheets

(56) References Cited

U.S. PATENT DOCUMENTS

| | | | |
|---|---|---|---|
| 4,773,239 A * | 9/1988 | Lowe et al. | 70/38 A |
| D301,217 S * | 5/1989 | Mailhot et al. | D12/115 |
| 5,096,068 A * | 3/1992 | Theriault | 211/22 |
| 5,133,461 A * | 7/1992 | Martinell | 211/21 |
| 5,833,074 A * | 11/1998 | Phillips | B60R 9/10 211/17 |
| 5,941,398 A * | 8/1999 | Harris | A47B 43/00 211/195 |
| 6,216,882 B1 * | 4/2001 | Strunck et al. | 211/18 |
| 6,223,907 B1 * | 5/2001 | Graber | 211/5 |
| 6,257,419 B1 * | 7/2001 | Kamysiak | 211/22 |
| 6,868,976 B1 * | 3/2005 | Lassanske et al. | 211/22 |
| 6,978,902 B2 * | 12/2005 | Loch | 211/5 |
| D514,034 S * | 1/2006 | Richardson | D12/115 |
| 7,318,530 B2 * | 1/2008 | Loch | 211/5 |
| 7,789,247 B2 * | 9/2010 | Loch | 211/5 |
| D659,598 S * | 5/2012 | Cariddi | D12/115 |
| D678,131 S * | 3/2013 | Hoadley | D12/115 |
| D682,410 S * | 5/2013 | Hester | D23/410 |
| D713,955 S * | 9/2014 | Hester | D23/410 |
| 2004/0182797 A1 * | 9/2004 | Loch | 211/5 |
| 2004/0251219 A1 * | 12/2004 | Zimmerman | 211/17 |
| 2006/0108296 A1 * | 5/2006 | Loch | 211/5 |
| 2006/0266717 A1 * | 11/2006 | Tsai | 211/17 |
| 2008/0173596 A1 * | 7/2008 | Loch | 211/5 |
| 2009/0078660 A1 * | 3/2009 | Kin | A47F 5/13 211/60.1 |
| 2013/0264297 A1 * | 10/2013 | Long | 211/20 |
| 2014/0265237 A1 * | 9/2014 | Strother et al. | 280/297 |
| 2015/0361692 A1 * | 12/2015 | Kindstrand et al. | 70/34 |

* cited by examiner

MODULAR BICYCLE RACK

BACKGROUND OF THE INVENTION

Although bicycle racks to suit a number of needs are currently available, conventional low-cost racks that are configured for the high-density parking of bicycles suffer from a number of drawbacks. For instance, one of the most common low-cost bicycle racks that is employed for high-density parking at many schools, churches, and small businesses comprises a frame that defines a number of vertical bars, such that a wheel of the bicycle must be wedged in between a pair of vertical bars. This conventional bicycle rack can cause damage to the wheel of the bicycle, often due to nothing more than the leaning of the bicycle. It is also not configured to be compatible with the U-shaped bicycle locks that are most commonly used today. The modular bicycle rack of the present disclosure provides a low-cost bicycle rack that may be configured for the high-density parking of bicycles and that does not suffer from these drawbacks.

Additionally, the transport of conventional bicycle racks to their location of use is typically difficult and/or costly and often requires transportation on pallets via LTL freight. In contrast, the modular bicycle rack of the present disclosure is configured to be inexpensively shipped to a desired destination and easily assembled and installed by the end-user at its location of use. If desired, the modular bicycle rack of the present disclosure may also be easily disassembled and stored for future use without requiring a large amount of storage space.

SUMMARY OF THE INVENTION

Embodiments of the present disclosure are directed to a modular bicycle rack that includes at least a first hoop structure, a second hoop structure, a first connector plate, and a second connector plate. The first hoop structure is attached to the second hoop structure by each of the first and second connector plates. A bicycle rack that is capable of providing parking and locking surfaces for at least four bicycles may be provided using only two connected hoop structures. However, additional parking and locking surfaces may be provided simply by the further connection of additional hoop structures. For example, a third hoop structure may be connected to the second hoop structure by each of a third and fourth connector plate. In a similar manner, additional hoop structures may be connected to the bicycle rack, with each hoop structure providing surfaces for the parking and locking of two additional bicycles.

Embodiments of the present disclosure are also directed to a set of components that is configured to be shipped and assembled to provide a bicycle rack. The set includes two or more substantially identical hoop structures, two or more substantially identical connector plates, and a plurality of fasteners, the fasteners being configured for affixing the connector plates to the hoop structures. The set may be specially configured so as to be easily shipped. For instance, in some embodiments, each hoop structure weighs less than ten pounds and each connector plate weighs less than five pounds. The set may also be specially configured so as to be easily assembled. For instance, in some embodiments, the connector plates may be easily affixed to the hoop structures using threaded fasteners, e.g. bolts, in order to assemble the bicycle rack.

Embodiments of the present disclosure are also directed to a set configured to be shipped and assembled to provide a bicycle rack, the set comprising components configured to be assembled to provide a bicycle rack having surfaces for the parking and locking of a desired number of bicycles. The components necessary to provide surfaces for the parking and locking of four bicycles may weigh about twenty pounds or less. And the components necessary to provide surfaces for the parking and locking of each additional two bicycles may weigh about fifteen pounds or less. Using the above-identified components, the set can be designed to provide surfaces for the parking and locking of any desired number of bicycles. For example, some embodiments may provide for the parking and locking of eight bicycles using components having a weight of about fifty pounds or less.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Reference will now be made in detail to certain embodiment(s), examples of which are illustrated in the accompanying drawings. Whenever possible, the same reference numerals will be used throughout the drawings to refer to the same or like parts.

Figure 1:
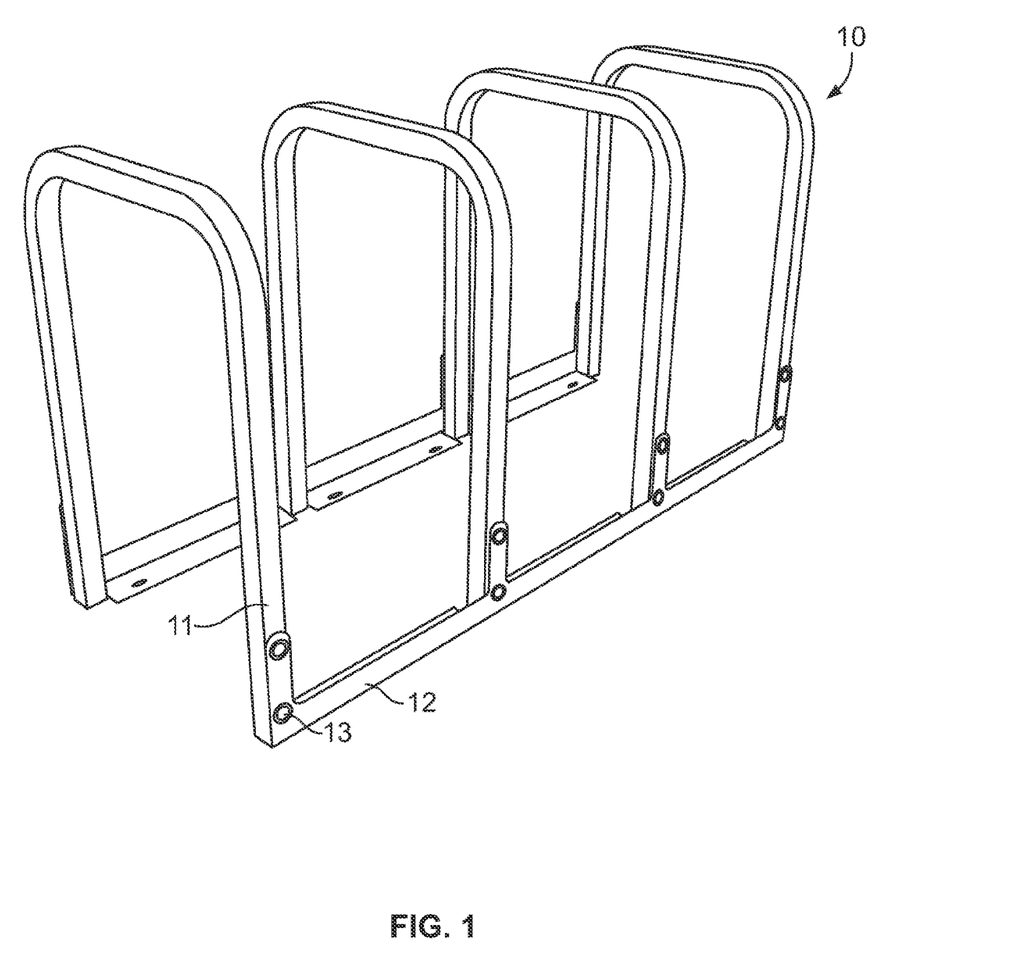
FIG. 1 is a perspective view of a modular bicycle rack according to an embodiment of the present disclosure.

An embodiment of the modular bicycle rack 10 is shown in FIG. 1. The modular bicycle rack 10 comprises a series of hoop structures 11, each of which is connected to one or more adjacent hoop structures by a pair of connector plates 12. The number of hoop structures 11 may be selected depending on the desired number of bicycles for which the modular bicycle rack 10 is configured to provide parking and locking surfaces. The number of connector plates 12 may then be determined based on the number of hoop structures 11.

The modular bicycle rack 10 of the present disclosure may be configured such that the hoop structures 11 are spaced a desired distance from one another in order to accommodate two bicycles within the space between adjacent hoop structures. The distance between the two hoop structures 11 is measured from the center of a first hoop structure to the center of a second hoop structure. In some embodiments, for example, adjacent hoop structures 11 may be spaced between about fourteen inches and about twenty-four inches from one another, alternatively between about fifteen inches and about twenty-two inches, alternatively between about fifteen inches and about twenty inches, alternatively between about sixteen inches and about eighteen inches. For example, in the embodiment illustrated in FIG. 1, the adjacent hoop structures are spaced apart from one another by a distance of about sixteen inches.

Embodiments of the modular bicycle rack 10 of the present disclosure are configured to be constructed using only two standardized components, a hoop structure 11 and a connector plate 12. By standardized, it is meant that each hoop structure 11 may be substantially identical to each other hoop structure and that each connector plate 12 may be substantially identical to each other connector plate. As such, any number of hoop structures 11 and a corresponding number of connector plates 12 may be configured to be assembled in any order in order to provide a modular bicycle rack 10 such as that illustrated in FIG. 1. Each connector plate 12 may be affixed to a hoop structure 11 by one or more fasteners 13.

Figure 2:
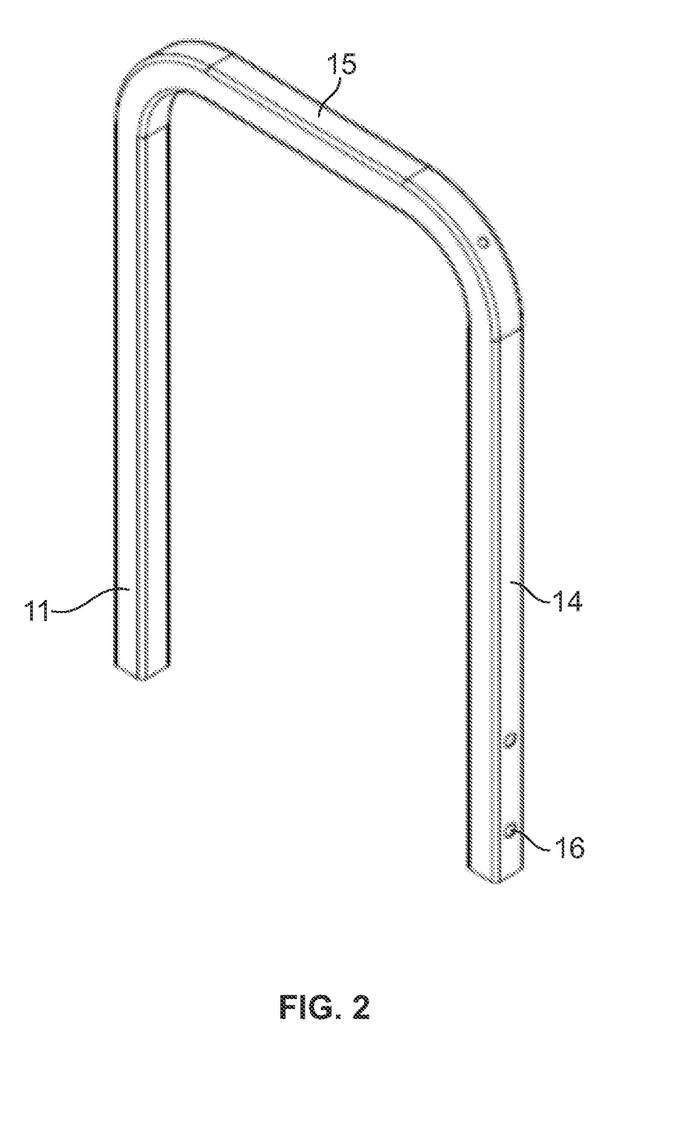
FIG. 2 is a perspective view of a hoop structure component of a modular bicycle rack according to an embodiment of the present disclosure.

In some embodiments, each hoop structure 11 comprises a hollow tube that has been formed to provide a pair of opposed legs 14 separated by an upper beam 15. For example, one embodiment of a hoop structure 11 of this sort is shown in FIG. 2. The opposed legs 14 and upper beam 15 provides that each hoop structure 11 supports a bicycle at two points and allows for the wheel and frame of the bicycle to be secured to the hoop structure using a conventional U-shaped bicycle lock.

The distance between the opposed legs 14 may be selected to both (a) be sufficient to provide support for the bicycle at two points of contact and (b) provide the bicycle rack with a small footprint, thereby providing space-saving benefits. In some embodiments, for instance, the distance between the opposed legs 14 is between about sixteen and about thirty inches, alternatively between about sixteen and about twenty-four inches, alternatively between about sixteen and about twenty inches. For example, in the embodiment illustrated in FIG. 2, the distance between the opposed legs 14 is about eighteen inches. Providing each hoop structure 11 with opposed legs 14 that are sufficiently spaced apart to provide effective support for bicycles of different frame sizes at two points of contact, but that are otherwise as close together as possible (i.e. at the lower end of an acceptable range) may also serve to minimize the amount of material used in each hoop structure, the weight of each hoop structure, the cost of transport for each hoop structure, and the storage space needed to store each hoop structure when not assembled.

The height of the upper beam 15 may be selected to provide for an effective locking of bicycles of different frame sizes to the hoop structure 11 using a conventional U-shaped bicycle lock. For instance, in some embodiments, the distance between the bottom edge of the opposed legs 14 and the top surface of the upper beam 15 may be between about twenty-five inches and about thirty inches, alternatively between about twenty-six inches and about thirty inches, alternatively between about twenty-seven inches and about twenty-nine inches. For example, in the embodiment illustrated in FIG. 2, the distance between the bottom edge of the opposed legs 14 and the top surface of the upper beam 15 is about twenty-eight and three-quarter inches. Providing each hoop structure 11 with a height that provides for an effective locking of bicycles of different frame sizes to the hoop structure 11 but that which is otherwise as small as possible (i.e. at the lower end of an acceptable range) may also serve to minimize the amount of material used in each hoop structure, the weight of each hoop structure, the cost of transport for each hoop structure, and the storage space needed to store each hoop structure when not assembled. Embodiments having smaller dimensions that are specifically designed for children's bicycles are also contemplated without departing from the scope of the present disclosure.

Generally, the hollow tube may be made of metal. While any of a number of metals may be used, steel provides a desired combination of strength and cost-effectiveness. In some embodiments, the steel may be a light gauge steel. The metal may also be galvanized in order to provide rust-resistance. And for some applications, the metal may be provided with a powder coat finish, such as a black powder coat finish.

The hollow tube may comprise any of a number of cross-sectional shapes. For instance, in some embodiments, the hollow tube may be generally circular. In some embodiments, such as the embodiment illustrated in FIG. 2, the hollow tube may have a generally rectangular or square shape, also referred to as a square tube. The use of square tube provides some additional benefits. For instance, it may be easily affixed to a connector plate 12 to provide a stable connection. As illustrated in FIG. 1 for example, a square tube may be pinched inward at the corners, e.g. on the underside of the hoop, as a result of the hoop-forming process.

The diameter of the tube, or the distance between the walls of a square tube, may vary. In some embodiments, it may be desirable to provide a tube having a diameter that is between about one and about two inches, alternatively between about one and one-quarter and about one and three-quarter inches. For instance, the square tube illustrated in FIG. 2 has a diameter of about one and one-half inches. This is generally sufficient to provide the hoop with a sufficient strength while at the same time minimizing material costs, weight, etc.

Toward the bottom of each of the opposed legs 14, the hoop structure 11 may also comprise one or more apertures 16. The one or more apertures 16 are configured to accept the one or more fasteners 13. For example, where the one or more fasteners 13 comprise threaded fasteners, the apertures may be configured such that each threaded fastener may be threaded into each aperture in order to affix the connector plate 12 to the hoop structure 11. In the embodiillustrated in FIG. 2, for example, the bottom portion of each leg 14 of the hoop structure 11 comprises two apertures 16.

Figure 3:
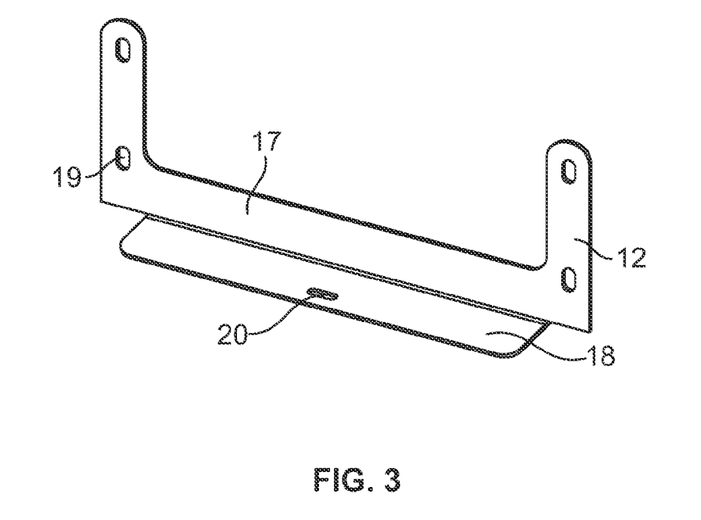
FIG. 3 is a perspective view of a connector plate component of a modular bicycle rack according to an embodiment of the present disclosure.

In some embodiments, each connector plate 12 may comprise an upright panel 17 and a ground panel 18. For example, one embodiment of a connector plate 12 of this sort is shown in FIG. 3. The upright panel 17 is generally configured to be affixed on a first end to a first hoop structure 11 and on a second end to a second hoop structure. In order to provide for a more stable connection with each hoop structure 11, each end portion of the upright panel 17 may extends above the ground panel 18 a height that is greater than the height of the portion of the upright panel spanning between the two end portions. The portion of the upright panel 17 spanning between the two end portions may be configured such that a bicycle tire may be rolled over the panel, for example in order to position a bicycle tire between two opposing connector plates 12. For example, in the embodiment illustrated in FIG. 3, the end portions of the upright panel extend to a height of about seven inches and the middle portion of the upright panel extends to a height of about two inches. Each end of the upright panel 17 may also comprise one or more through-holes 19. The one or more through-holes 19 are configured to align with the apertures 16 on of the hoop structure to provide for the fastening of the connector plate 12 to the hoop structure 11.

The ground panel 18 is generally configured to provide a surface that rests on the ground and forms a stable base for the bicycle rack 10. Accordingly, the bicycle rack 10 may generally be capable of standing in an upright position without any anchoring to the surface on which it is installed (and may in some situations be used as such). The ground panel 18 desirably extends a distance away from the upright panel 17, and inward toward the center of the bicycle rack 10 when assembled, that provides such a supporting surface. For instance, in the embodiment illustrated in FIG. 3, the ground panel 18 extends about two and a half inches away from the upright panel 17. The ground panel may also comprise one or more anchor holes 20. The anchor holes 20 are configured such that an anchor 34, for example a wedge anchor, may be inserted through the anchor hole and into the surface on which the bicycle rack 10 is installed.

In some embodiments, the upright panel 17 and the ground panel 18 may each be substantially flat. A substantially flat upright panel 17 provides that the connector plate 12 may be easily affixed to a hoop structure 11 comprising a square tube to form a stable connection. A substantially flat ground panel 18 provides that the bicycle rack 10 may rest stably on the ground. The substantially flat upright panel 17 and the substantially flat ground panel 18 may be generally perpendicular to one another. In other words, the substantially flat upright panel 17 and the substantially flat ground panel 18 may form an angle that is about 90 degrees, as is illustrated in FIG. 3.

The upright panel 17 and the ground panel 18 may be integrally formed to provide a connector plate 12 of a single piece. Generally, the connector plate 12 is made of metal. While any of a number of metals may be used, steel provides a desired combination of strength and cost-effectiveness. In some embodiments, the steel may be laser cut. Again, the metal may be galvanized in order to provide rust-resistance. And for some applications, the metal may be provided with a powder coat finish, such as a black powder coat finish.

The modular bicycle rack 10 of the present disclosure may be configured such that adjacent hoop structures 11 are spaced a desired distance from one another in order to accommodate two bicycles within the space between the two adjacent hoop structures. Thus, the length of the connector plate 12 may be selected so as to provide a desired distance between two adjacent hoop structures 11. For example, in some embodiments, the connector plate may be between about sixteen and about twenty-five inches long, alternatively between about sixteen and about twenty-two inches long, alternatively between about sixteen and about twenty inches long. For example, the embodiment of the connector plate 12 illustrated in FIG. 3 has a length of about seventeen and one-half inches (which is measured as the farthest distance between each end, in this case the edges of the upright panel 17). In this embodiment, the length of about seventeen and one-half inches is designed to take into account the one and one-half inch width of each hoop structure 11 and, when assembled, provide that adjacent hoop structures are about sixteen inches apart from one another, as measured from the center of the first hoop structure to the center of the second hoop structure.

In some embodiments, the ground panel 18 may be configured to fit between the legs of two hoop structures 11, i.e. the ground panel may have a length that is slightly less than the distance between two adjacent hoop structures when the bicycle rack 10 is assembled. Accordingly, the length of the ground panel 18 may be less than the length of the upright panel 17. For example, in the embodiment illustrated in FIG. 3, the length of the ground panel 18 is about fourteen and three-tenth inches, which is configured to take into account the one and one-half inch width of each hoop structure 11 and provide a one-tenth inch space at each end to account for machine tolerances and the like in order to ensure that the ground panel forms a proper fit between adjacent hoop structures.

Each connector plate 12 may be affixed to each hoop structure 11 by one or more fasteners 13. In some embodiments, each of the one or more fasteners 13 may be selected from bolts, screws, rivets, clips, or the like. In some embodiments, it may be desirable that each fastener 13 is substantially identical. For example, in some embodiments, each fastener 13 may be a threaded fastener having substantially identical dimensions. It also may be desirable that at least one of the one or more fasteners 13 used to affix a connector plate 12 to a hoop structure 11 be a tamper-evident fastener. A tamper-evident fastener may include any fastener that requires a specialized tool in order to remove the fastener. For example, in FIG. 1, a pair of fasteners 13 is used to affix an end of a connector plate 12 to a hoop structure 11. In some embodiments, one of the pair of fasteners 13 may be a tamper-evident fastener.

As illustrated in FIGS. 4A through 4D, the modular bicycle rack 10 of the present disclosure may be quickly and easily assembled from its components. At a minimum, the modular bicycle rack 10 comprises a first hoop structure 21 and a second hoop structure 22. The first hoop structure 21 is connected, or attached, to the second hoop structure 22 by each of a first connector plate 23 and a second connector plate 24. For example, a first end of the first connector plate 23 may be affixed to the first hoop structure 21 and a second end of the first connector plate may be affixed to the second hoop structure 22. Similarly, a first end of the second connector plate 24 may be affixed to the first hoop structure 21 and a second end of the second connector plate may be affixed to the second hoop structure 22.

Where the modular bicycle rack 10 consists of only two hoop structures, e.g. to provide parking spaces for four bicycles, a user may simply fasten each of the first and second connector plates 23, 24 to each of the first and second hoop structures 21, 22 as described above. More commonly, however, the modular bicycle rack 10 will comprise at least one, and often multiple additional hoop structures. For example, the modular bicycle rack 10 may also comprise a third hoop structure 25. The third hoop structure 25 is connected, or attached, to the second hoop structure 22 by each of a third connector plate 26 and a fourth connector plate 27. For example, a first end of the third connector plate 26 may be affixed to the second hoop structure 22 and a second end of the third connector plate may be affixed to the third hoop structure 25. Similarly, a first end of the fourth connector plate 27 may be affixed to the second hoop structure 22 and a second end of the fourth connector plate may be affixed to the third hoop structure 25.

Figure 4A:
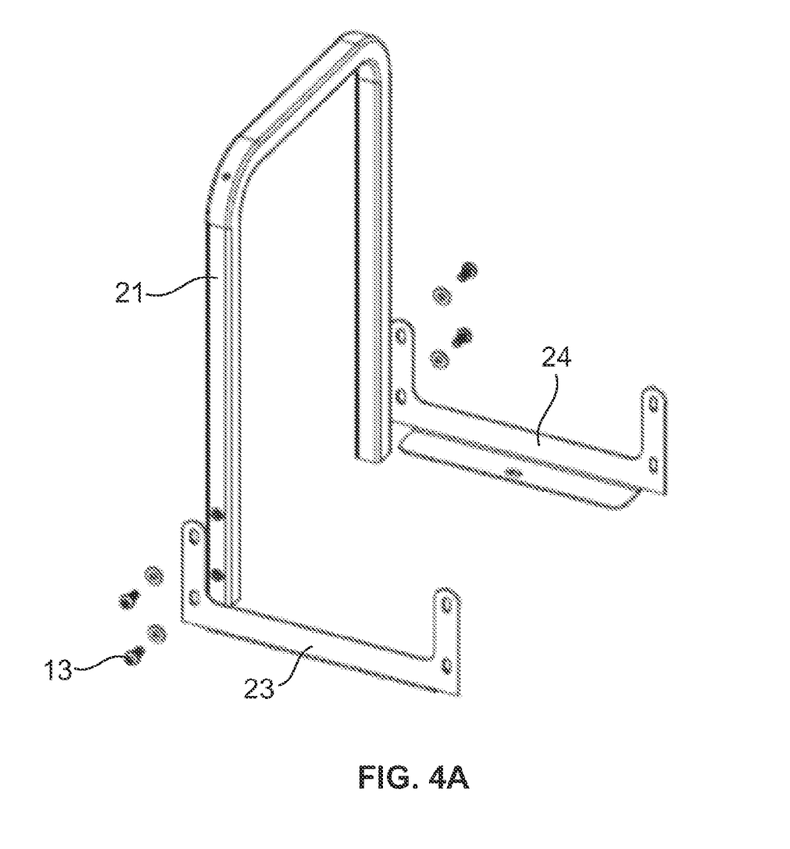
FIG. 4A is a perspective view of a first step in the assembly of a modular bicycle rack according to an embodiment of the present disclosure.

The assembly of a bicycle rack 10 comprising multiple hoop structures is described and illustrated in FIGS. 4A through 4D. As illustrated in FIG. 4A, a user may first attach each of the first connector plate 23 and the second connector plate 24 to the first hoop structure 21. In some embodiments, at least one of the fasteners 13 used to attach the first connector plate 23 to the first hoop structure 21 is a tamper-resistant fastener and at least one of the fasteners used to attach the second connector plate 24 to the first hoop structure 21 is a tamper-resistant fastener. The use of tamper-resistant fasteners 13 in this manner ensures that one may not remove the first hoop structure 21 from either of the first or second connector plates 23, 24 (which might be attempted in order to separate a locked bicycle from the bicycle rack 10).

Figure 4B:
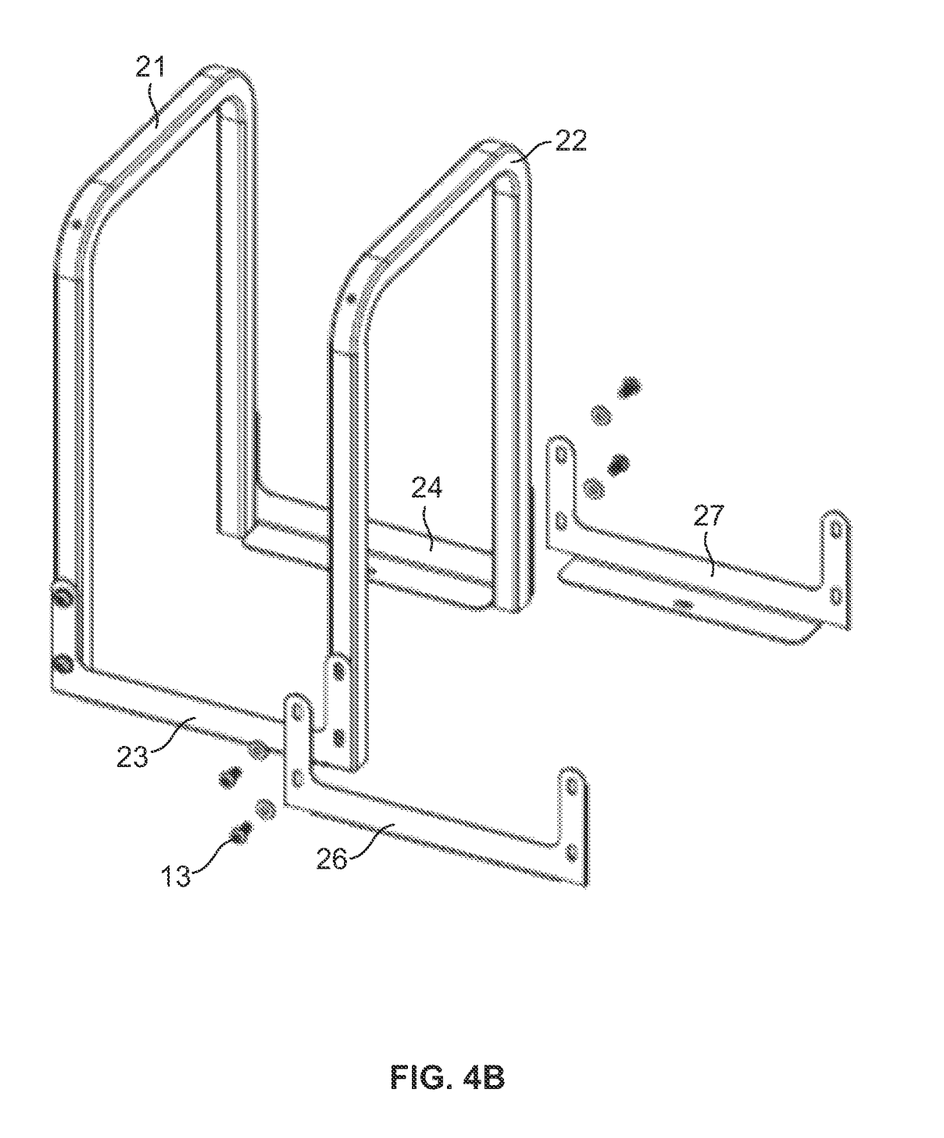
FIG. 4B is a perspective view of a further step in the assembly of a modular bicycle rack according to an embodiment of the present disclosure.

Next, as illustrated in FIG. 4B, a user may attach the second hoop structure 22 to each of the first and second connector plates 23, 24. However, in some embodiments, at the same time and using the same fasteners 13, a user may also attach the second hoop structure 22 to each of the third and fourth connector plates 26, 27. Accordingly, each of the fasteners 13 that is used to attach the first connector plate 23 to the second hoop structure 22 may also be used to attach the third connector plate 26 to the second hoop structure 22, as illustrated in FIG. 4B. Similarly, each of the fasteners 13 that is used to attach the second connector plate 24 to the second hoop structure 22 may also be used to attach the fourth connector plate 27 to the second hoop structure. In other words, each of the one or more fasteners 13 that are used to affix each of the first and second connector plates 23, 24 to the second hoop 22 may also be used to affix each of the third and fourth connector plates 26, 27 to the second hoop.

Figure 4C:
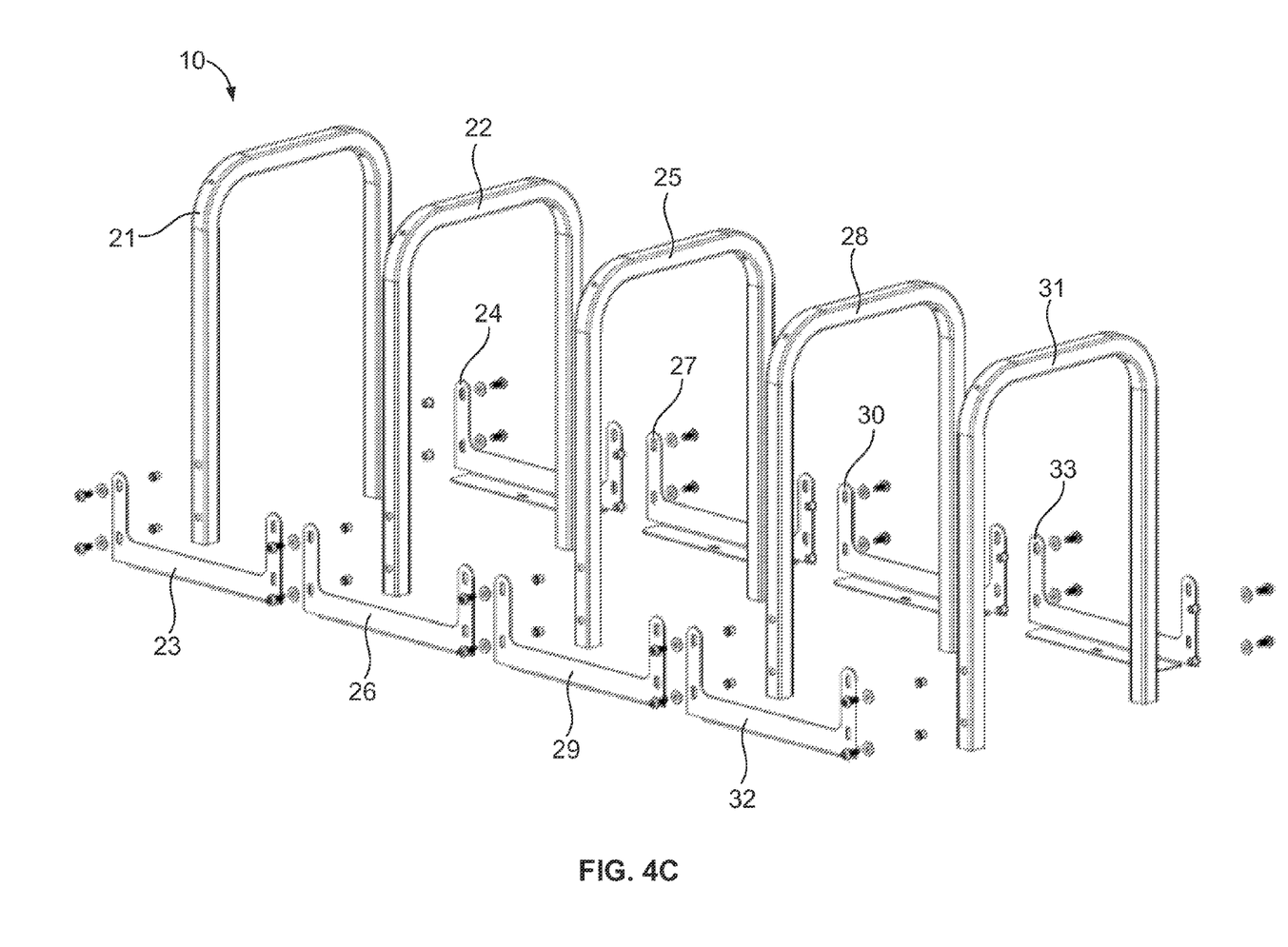
FIG. 4C is a perspective view of a further step in the assembly of a modular bicycle rack according to an embodiment of the present disclosure.

As illustrated in FIG. 4C, additional hoop structures 28, 31 may be added onto the modular bicycle rack 10 in the manner described above. After the first and second hoop structures 21, 22, the attachment of each additional hoop structure 25, 28, 31 requires one additional hoop structure 11 and two additional connector plates 12. Once each of the desired number of hoop structures 11 are attached to the modular bicycle rack 10, assembly of the bicycle rack is complete.

Figure 4D:
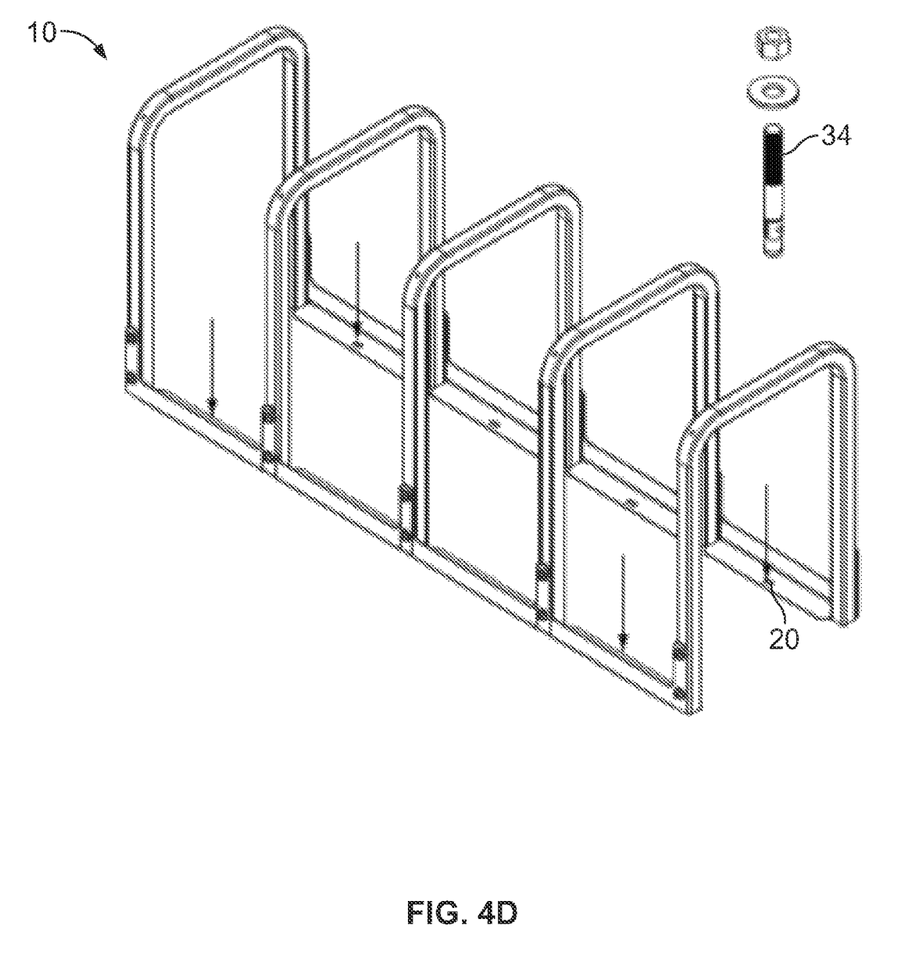
FIG. 4D is a perspective view of a further step in the assembly of a modular bicycle rack according to an embodiment of the present disclosure.

In some embodiments, a user may anchor the bicycle rack to the ground, such as through one or more anchors 34. The one or more anchors 34 may be configured to anchor the bicycle rack on a concrete surface. Each anchor 34 may be selected from among the many types of anchors that would be understood by a person of ordinary skill in the art. For example, the one or more anchors 34 may comprise one or more wedge anchors. Each of the one or more anchors 34 is inserted through an anchor hole 20 that is present on one of the connector plates 12. The number of anchors 34 that should be used in order to effectively install the bicycle rack 10 will depend on a number of factors. As illustrated in FIG. 4D, in some embodiments it may be desirable to anchor the bicycle rack 10 at each end, such as by affixing anchors 34 through the connector plates 12 located at each end of the rack. Where the bicycle rack 10 comprises a large number of hoop structures 11, it may also be desirable to anchor the bicycle rack at one or more locations in between the two ends.

Figure 5A:
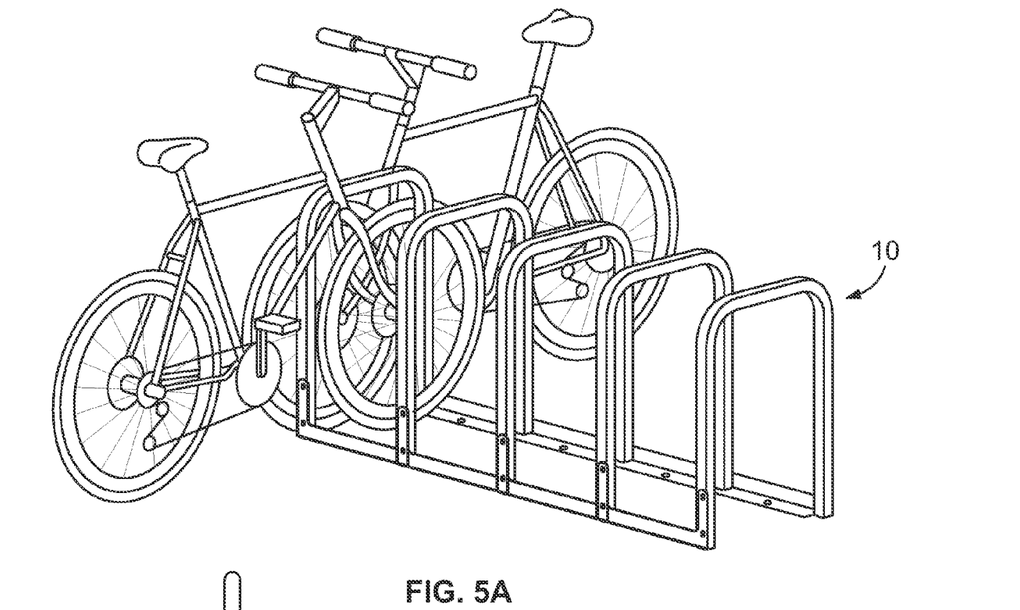
FIG. 5A is a perspective view of a modular bicycle rack according to an embodiment of the present disclosure, illustrating the contemplated use of the modular bicycle rack for the parking of bicycles.
Figure 5B:
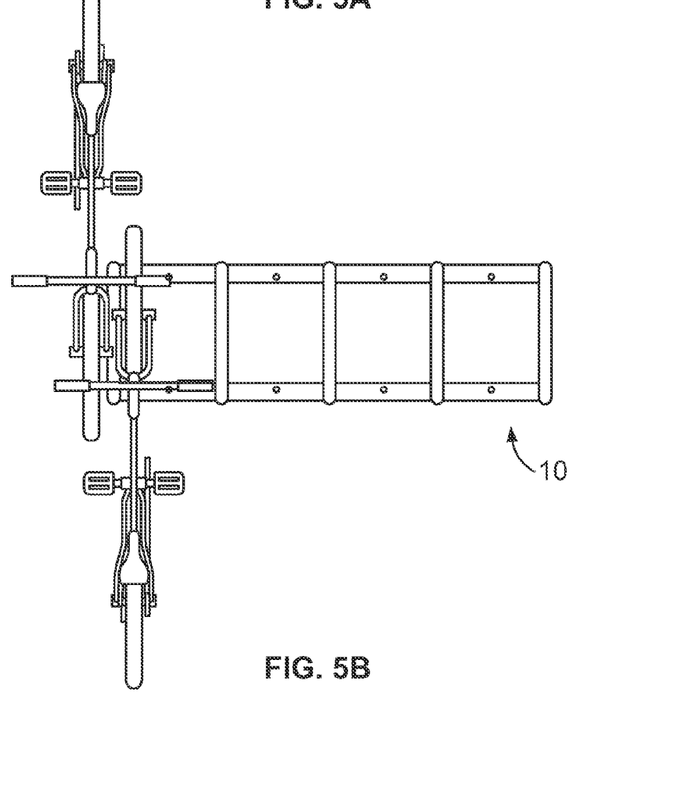
FIG. 5B is a top plan view of a modular bicycle rack according to an embodiment of the present disclosure, illustrating the contemplated use of the modular bicycle rack for the parking of bicycles.

As illustrated in FIGS. 5A and 5B, each hoop structure 11 is configured to provide parking and locking surfaces for two bicycles. Because each hoop structure 11 is configured to provide parking and locking surfaces for two bicycles, the bicycle rack 10 of the present disclosure is configured to provide parking for two times as many bicycles as there are hoop structures present in the rack. Accordingly, one may assemble a bicycle rack 10 that is configured to provide as many, or as few, parking spaces as is desired to fit a given space and usage pattern. Because of the ease with which one may add additional hoop structures 11 to a previously installed rack 10 and/or remove hoop structures from a previously installed rack, the size of the bicycle rack 10 may be adjusted throughout its lifetime to render the rack particularly suitable for a multitude of different locations, changing usage patterns, etc.

It is also contemplated that, in some embodiments, the modular bicycle rack 10 of the present disclosure may be used as a temporary bicycle rack, such as when additional bicycle parking may be required for a temporary or travelling event. Additionally, where space is at a premium, such as in many urban environments, it is contemplated that the modular bicycle rack 10 of the present disclosure could be used by a municipality to ease bicycle parking congestion that may result from temporary changes or closures to public transportation, official city events that result in an increased need for bicycle parking, etc. It is believed that the modular bicycle rack 10 of the present disclosure is particularly suitable for this manner of use due to the ease of assembly and disassembly, the small storage footprint, and the ease of transporting the components of the bicycle rack from one location to another.

Another aspect of the present disclosure is directed to a set of components that is configured to be assembled to provide a bicycle rack of a desired size. The set comprises at least two or more hoop structures 11, two or more connector plates 12, and a plurality of fasteners 13 for affixing the connector plates to the hoop structures in order to assemble the bicycle rack 10. In some embodiments, each of the hoop structures 11 is substantially identical. Each of the connector plates 12 may also be substantially identical. The plurality of fasteners 13 may comprise any number and type of fasteners. For example, in some embodiments the set of components may comprise more fasteners 13 than may be necessary to assemble the bicycle rack 10.

The set of components, i.e. the unassembled bicycle rack 10 of the present disclosure, may also be configured to have enhanced shippability. In some embodiments, for example, each hoop structure 11 may be configured to weigh less than twelve pounds, alternatively less than ten pounds, alternatively less than nine pounds, and alternatively less than eight pounds. For example, in some embodiments each hoop structure 11 may weight about seven pounds. Each connector plate 12 may be configured to weigh less than six pounds, alternatively less than five pounds, alternatively less than four pounds, alternatively less than three pounds. For example, in some embodiments each connector plate 12 may weight about two and three-quarter pounds.

In some embodiments, the set of components to be shipped and assembled to provide a bicycle rack 10 may be selected to provide a bicycle rack that is suitable for providing parking and locking surfaces for a desired number of bicycles. For example, the components necessary to provide surfaces for the parking and locking of four bicycles may weigh less than twenty-five pounds, alternatively less than twenty-three pounds, alternatively less than twenty-one pounds, alternatively less than twenty pounds. These components may comprise two hoop structures 11 and two connector plates 12, along with a plurality of fasteners 13. To provide surfaces for the parking and locking of an additional two bicycles, the set may comprise additional components, the additional components weighing less than eighteen pounds, alternatively less than sixteen pounds, alternatively less than fifteen pounds, alternatively less than fourteen pounds, alternatively less than thirteen pounds. These additional components may comprise one hoop structure 11 and two connector plates 12, as well as any additional fasteners 13 that may be needed and/or desired.

By selecting a desired number of hoop structures 11 to add onto the bicycle rack 10, the set of components may be configured to provide a bicycle rack having parking and locking surfaces for any desired number of bicycles. For example, in order to provide surfaces for the parking and locking of each additional two bicycles, the set may simply comprise additional components as described above.

In some embodiments, the set of components, i.e. the unassembled bicycle rack 10 of the present disclosure, may comprise four hoop structures 11, six connector plates 12, and fasteners 13 for affixing the connector plates to the hoop structure. The bicycle rack 10 that may be assembled using this set of components provides parking spaces for at least eight bicycles. In this embodiment, the set of components may have a shipping weight of sixty pounds or less, alternatively fifty-five pounds or less, alternatively fifty pounds or less. For example, the set of components may have a shipping weight of about forty-nine pounds. The set of components may also be configured such that the components may be shipped together in a single box having dimensions of 27"×35"×12" or less. For example, the set may be configured such that the components are capable of being shipped together in a box having dimensions of 24"×32"×9".

A set of components that is configured in accordance with the embodiments described above may easily be shipped in cardboard boxes and transported by parcel carriers, such as FedEx. When a bicycle rack 10 configured for higher volume parking, i.e. more than eight bicycles, is desired, the supplementary components may be divided up into sets as described above and shipped in the same manner. In this way, any size bicycle rack (i.e. a bicycle rack having surfaces for the parking and locking of any number of bicycles) may be shipped in cardboard boxes and transported by a parcel carrier.

The sets of the present disclosure provide a number of significant benefits over conventional bicycle racks. For instance, a conventional bicycle rack providing surfaces for the parking and locking of eight bicycles typically weighs one hundred and fifty pounds or more. These conventional bicycle racks must therefore be shipped on pallets and by LTL freight. In addition to higher base transportation costs associated with LTL freight, the pallet and packaging typically adds another fifty or more pounds, which further increases the shipping cost.

Another advantage to the sets of modular components described above is that a bicycle rack 10 of any size may be shipped to locations and markets where LTL freight is impossible, undesirable (e.g. due to heavy and bulky pallets), or prohibitively expensive. For example, using the sets of modular components described in the present disclosure, a bicycle rack 10 of any desired size may be shipped to consumer markets such as small businesses, churches, schools, municipalities, apartment complexes, and even home owners. The modularity of the components also ensures that the bicycle rack 10 may be easily assembled and installed by end-user individuals.

It can be seen that the described embodiments provide a unique and novel bicycle rack that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:
1. A modular bicycle rack comprising:
 a. a first hoop structure and a second hoop structure,
 b. a first connector plate and a second connector plate,
 c. a third hoop structure, and
 d. a third connector plate and a fourth connector plate;
 wherein the first hoop structure is attached to the second hoop structure by the first and second connector plates;
 wherein each of the first and second connector plates comprises
  a substantially flat upright panel, and
  a substantially flat ground panel;
 wherein the upright panel and the ground panel form an angle that is about 90 degrees;
 wherein each of the third and fourth connector plates comprises
  a substantially flat upright panel, and
  a substantially flat ground panel;
 wherein the upright panel and the ground panel form an angle that is about 90 degrees; and
 wherein the third hoop structure is attached to the second hoop structure by the third and fourth connector plates.

2. The modular bicycle rack of claim 1, in which
 a first end of the first connector plate and a first end of the second connector plate are each affixed to the first hoop structure and
 a second end of the first connector plate and a second end of the second connector plate are each affixed to the second hoop structure.

3. The modular bicycle rack of claim 2, wherein each of the first and second connector plates are affixed to each of the first and second hoop structures by one or more threaded fasteners.

4. The modular bicycle rack of claim 3, wherein at least one of the one or more threaded fasteners is tamper-resistant.

5. The modular bicycle rack of claim 1, wherein the first hoop structure and the second hoop structure are substantially identical and wherein the first connector plate and the second connector plate are substantially identical.

6. The modular bicycle rack of claim 1, wherein the first hoop structure is spaced from the second hoop structure by a distance between about 15 and about 20 inches.

7. The modular bicycle rack of claim 1, wherein each of the first and second hoop structures comprises a square tube.

8. The modular bicycle rack of claim 1, in which
 a first end of the first connector plate and a first end of the second connector plate are each affixed to the first hoop structure, and a second end of the first connector plate and a second end of the second connector plate are each affixed to the second hoop structure; and a first end of the third connector plate and a first end of the fourth connector plates are each affixed to the second hoop structure, and a second end of the third connector plate and a second end of the fourth connector plate are each affixed to the third hoop structure;

in which each of the connector plates is affixed to each of the hoop structures by one or more fasteners, and wherein the one or more fasteners that affix each of the first and second connector plates to the second hoop also affix each of the third and fourth connector plates to the second hoop.

9. A set configured to be shipped and assembled to provide a modular bicycle rack of a desired size, the set comprising:
 a. a first hoop structure and a second hoop structure,
 b. a first connector plate and a second connector plate,
 c. a third hoop structure,
 d. a third connector plate and a fourth connector plate, and
 e. fasteners for affixing the connector plates to the hoop structures;
wherein, when assembled, the first hoop structure is attached to the second hoop structure by the first and second connector plates;
wherein each of the first and second connector plates comprises
 a substantially flat upright panel, and
 a substantially flat ground panel;
wherein the upright panel and the ground panel form an angle that is about 90 degrees;
wherein each of the third and fourth connector plates comprises
 a substantially flat upright panel, and
 a substantially flat ground panel;
wherein the upright panel and the ground panel form an angle that is about 90 degrees; and
wherein, when assembled, the third hoop structure is attached to the second hoop structure by the third and fourth connector plates.

10. The set of claim 9, wherein each hoop structure weighs less than 10 lbs.

11. The set of claim 9, wherein each connector plate weighs less than 5 lbs.

12. The set of claim 9, wherein the set is configured such that four hoop structures, six connector plates, and fasteners for affixing the connector plates to the hoop structures together weigh 50 lbs. or less.

13. The set of claim 12, wherein the set is configured such that four hoop structures, six connector plates, and fasteners for affixing the connector plates to the hoop structures together have dimensions of 27"×35"×12" or less.

14. The set of claim 9, wherein each connector plate is configured to be affixed to each hoop structures using at least one tamper-resistant fastener.

15. The set of claim 9, wherein
 a first hoop structure is configured to be attached to a second hoop structure by affixing a first end of a first connector plate and a first end of a second connector plate to opposing legs of the first hoop structure and affixing a second end of the first connector plate and a second end of the second connector plate to opposing legs of the second hoop structure;
 a third hoop structure is configured to be attached to the second hoop structure by affixing a first end of a third connector plate and a first end of a fourth connector plate to opposing legs of the second hoop structure and affixing a second end of the third connector plate and a second end of the fourth connector plate to opposing legs of the third hoop structure; and
 wherein the second end of the first connector plate and the first end of the third connector plate are affixed to the second hoop structure using the same one or more fasteners, and the second end of the second connector plate and the first end of the fourth connector plate are affixed to the second hoop structure using the same one or more fasteners.

* * * * *